United States Patent [19]

Levien

[11] Patent Number: 5,555,308
[45] Date of Patent: Sep. 10, 1996

[54] ENCRYPTION OF SIGNALS TO INSURE VIEWERSHIP OF COMMERCIALS

[75] Inventor: Jack R. Levien, McDowell, Va.

[73] Assignee: Angelika R. Levien, McDowell, Va.

[21] Appl. No.: 337,672

[22] Filed: Nov. 10, 1994

[51] Int. Cl.$^6$ .................................................. H04L 9/00
[52] U.S. Cl. ................................................ 380/20; 380/21
[58] Field of Search .................................... 380/20, 21, 9

[56] References Cited

U.S. PATENT DOCUMENTS

| Re. 33,189 | 3/1990 | Lee et al. .................... 380/21 |
|---|---|---|
| 3,764,742 | 10/1973 | Abbott et al. ................. 380/21 |
| 4,592,546 | 6/1986 | Fascenda et al. . |
| 4,694,490 | 9/1987 | Harvey et al. ................. 380/20 |
| 4,704,725 | 11/1987 | Harvey et al. ................. 380/9 |
| 4,731,840 | 3/1988 | Mniszewski et al. ........... 380/21 |
| 4,745,468 | 5/1988 | Von Kohorn . |
| 4,881,263 | 11/1989 | Herbison et al. ............... 380/21 |
| 4,926,478 | 5/1990 | Gruenberg ....................... 380/21 |
| 4,965,825 | 10/1990 | Harvey et al. ................. 380/9 |
| 5,057,915 | 10/1991 | Von Kohorn . |
| 5,083,800 | 1/1992 | Lockton . |
| 5,128,752 | 7/1992 | Von Kohorn . |
| 5,212,551 | 5/1993 | Conanan . |
| 5,400,403 | 3/1995 | Fahn et al. .................... 380/21 |

Primary Examiner—Salvatore Cangialosi

[57] ABSTRACT

A system for distributing data to attract consumers to a commercial message provides for the delivery of free data to the consumer. The commercial message includes instructions in the form of a code, which can be a word or phrase, in the video or audio portion of the commercial message. The broadcast data is typically scrambled, such as by encryption, and the consumer uses the broadcast code to receive and decrypt the desired digital data for storage into a home computer. In order to receive the proper code, the consumer must pay close attention to the commercial message. The consumer's computer is connected to receiving circuitry so that upon entry of the proper code, broadcast data is downloaded into the computer memory and decoded. The complimentary digital data thus delivered is typically useful information such as stock prices, weather information, sports scores, etc. The packets of desirable data are delivered transparent to the receiver, or alternatively as a visual or audible burst.

24 Claims, 7 Drawing Sheets

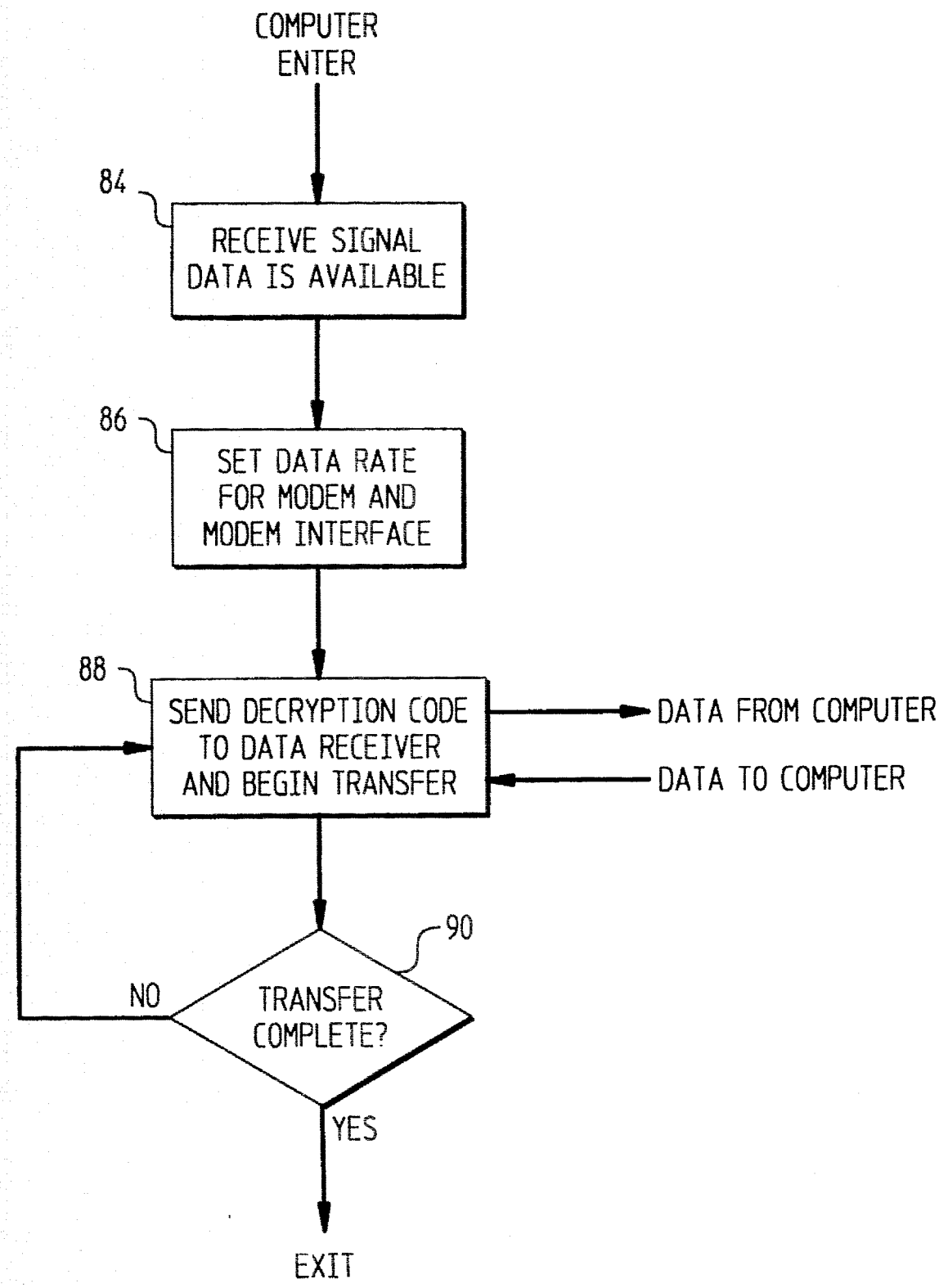

ENCRYPTION OF SIGNALS TO INSURE VIEWERSHIP OF COMMERCIALS

FIELD OF THE INVENTION

The present invention relates to the field of data distribution, and in particular, to a method and apparatus for distributing free data to attract consumers to pay close attention to a commercial message.

BACKGROUND OF THE INVENTION

Broadcasting digital data over conventional transmission channels such as television, AM, FM radio, microwave radio, optical fiber, or ordinary telephone cables is well known technology and used for many purposes. For example, encoded data embedded in television signals (i.e., in the same channel or frequency band of the television signal) has been used to generate closed captions for the hearing impaired. Transmitted data consisting of financial information such as stock ticker tape data current news, weather and sports has been transmitted as imbedded data in both radio and television signals. Imbedded information has been provided free, sold on a subscription basis or paid for according to the amount of data actually used by the subscriber. Examples of methods and apparatus to encode data in a television signal are shown in U.S. Pat. No. 5,212,551.

In U.S. Pat Nos. 4,592,546 to Faccenda, and 5,083,800 to Lockton, digital data is broadcast to a dedicated device used in conjunction with a live broadcast of a sporting event. The object is for the person (player) following a sporting event to predict the outcome of certain events. The disclosed system includes a method of preventing the player from entering the answer after the event has happened. The system is two way, in that a communication channel is provided to send the player's guesses back to a central computer to determine the player's score, etc, to simulate a degree of interactivity with a sporting event.
U.S. Pat. Nos. 4,926,255, 5,034,807, 5,227,874, 5,249,044, and 5,283,734

In U.S. Pat. Nos. 4,745,468, 5,057,915, 5,128,752, to Von Kohorn, data is broadcast at no cost, and the object is for the person receiving the broadcast to be rewarded with a coupon or token, if the correct answers to a question posed on the broadcast is entered on a computer-like device that makes the coupon. The coupon is physically presented at the premises of the sponsor of the broadcast to receive a reward in the form of a discount, special offer, and the like. Couponing to receive a benefit is based on the idea that value is contained in goods and services. Accordingly, the consumer will pay close attention to programming and commercial messages in order to receive a benefit in the form of a coupon.

SUMMARY OF THE INVENTION

However, an information product, or data, has value. Consumers pay billions of dollars for products based on information content in the form of newspapers and magazines, computer software, music, financial and insurance products, as well as on line data services.

Accordingly, with information valued as a desirable product, the consumer will be attracted to a commercial message that offers free data. In accordance with the present invention, at the time a commercial message is started, the broadcaster announces several steps that the consumer must follow, and one or more codes to be entered in order to receive and decode broadcasted digital data into a home computer. The code may be part of the video or audio portion of the commercial message. Typically, a code is a simple and easy to remember word or phase, which also may emphasize the sponsor's product. If the consumer enters the proper code within the time allowed, free data is broadcast and downloaded to the consumer's home computer. After the commercial message, the consumer is free to use the data.

Preferably, the broadcast data is scrambled, such as by encryption, to preclude unattended data collection without viewing the commercial messages. In such manner, the use of the present invention encourages viewership of commercial messages in order to receive free valuable data.

For example, in accordance with the present invention, a radio broadcast could offer free data relating to weather or winning lottery numbers. A television beer commercial could offer a free data consisting of sports scores and baseball statistics.

A physical connection to the consumer's computer is provided via a standard data or facsimile modem connected to a broadcast data receiving apparatus. Also disclosed is a data receiving apparatus for receiving out of band data at a higher rate than the standard data or facsimile modem rates, storing the received data and formatting and transmitting the stored data at standard data or facsimile modem rates.

BRIEF DESCRIPTION OF THE FIGURES

FIG. 7 is a flow chart diagram of the operation of a data receiver for transferring a locally stored commercial broadcast message data to a computer in accordance with the present invention.

DETAILED DESCRIPTION

Figure 1:
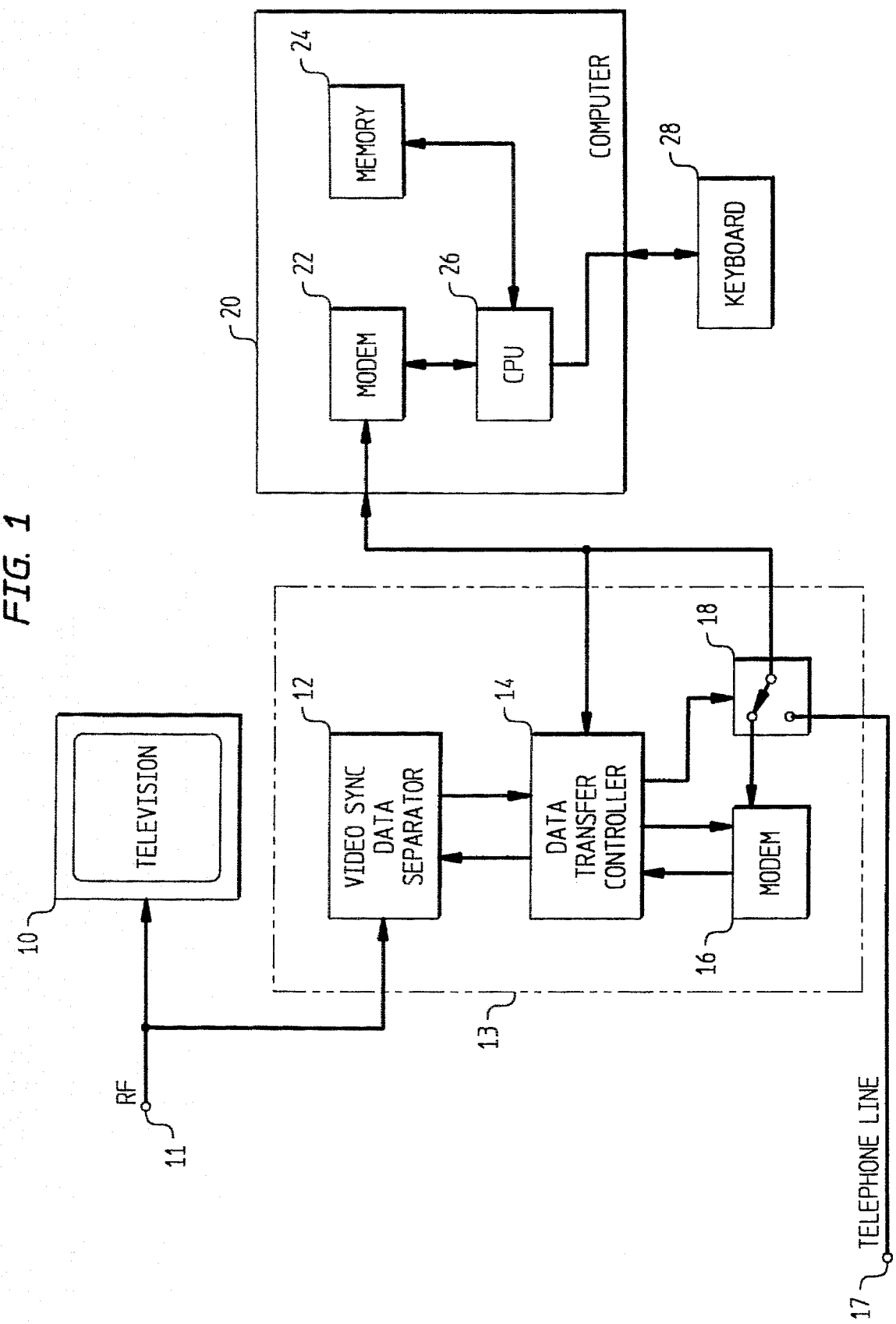
FIG. 1 is a block diagram of a system embodying the present invention wherein imbedded data is encoded onto a video signal and delivered to consumers.

As shown in FIG. 1, a television 10 is connected to a source of video signal transmitted on a broadband RF spectrum at antenna terminal 11. A home computer 20 comprising a memory 24, CPU 26, keyboard 28 and modem 22 is coupled to antenna terminal 11 through another modem 16, data transfer controller 14 and video sync data separator 12, which also includes a tuner for receiving the same video signal as is viewed on television 10. The telephone line 17, normally connected to modem 22 through switch 18. When activated, switch 18 disconnects modem 22 from the telephone line 17 and couples modem 22 to modem 16 instead.

Figure 2:
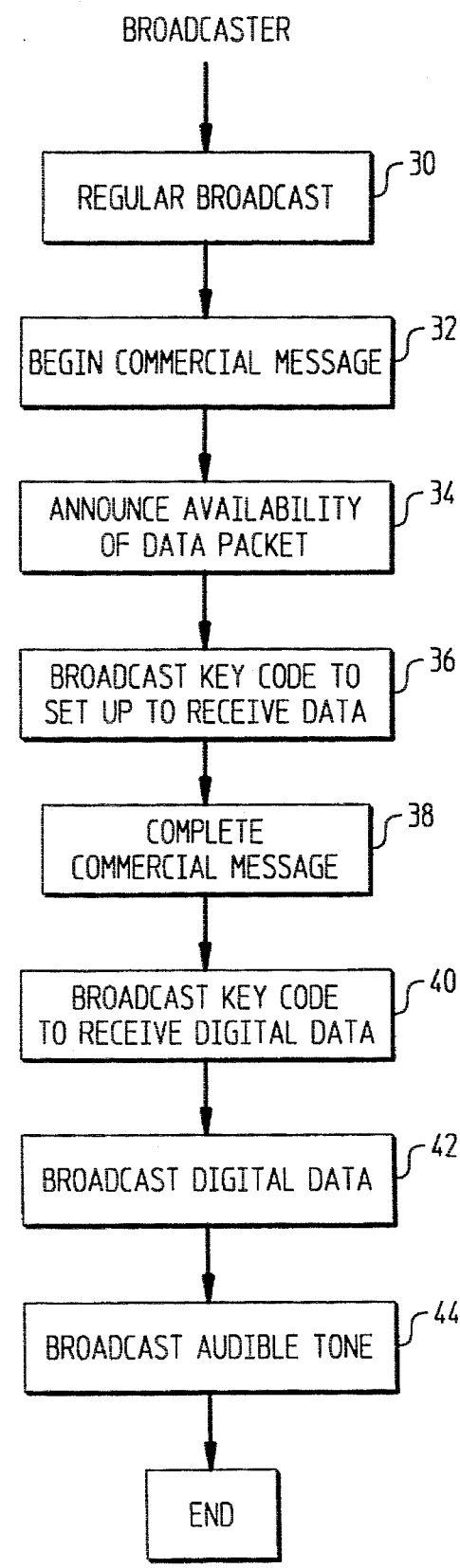
FIG. 2 is a flow chart diagram of the operation of the broadcaster providing a commercial message in accordance with the present invention.
Figure 3:
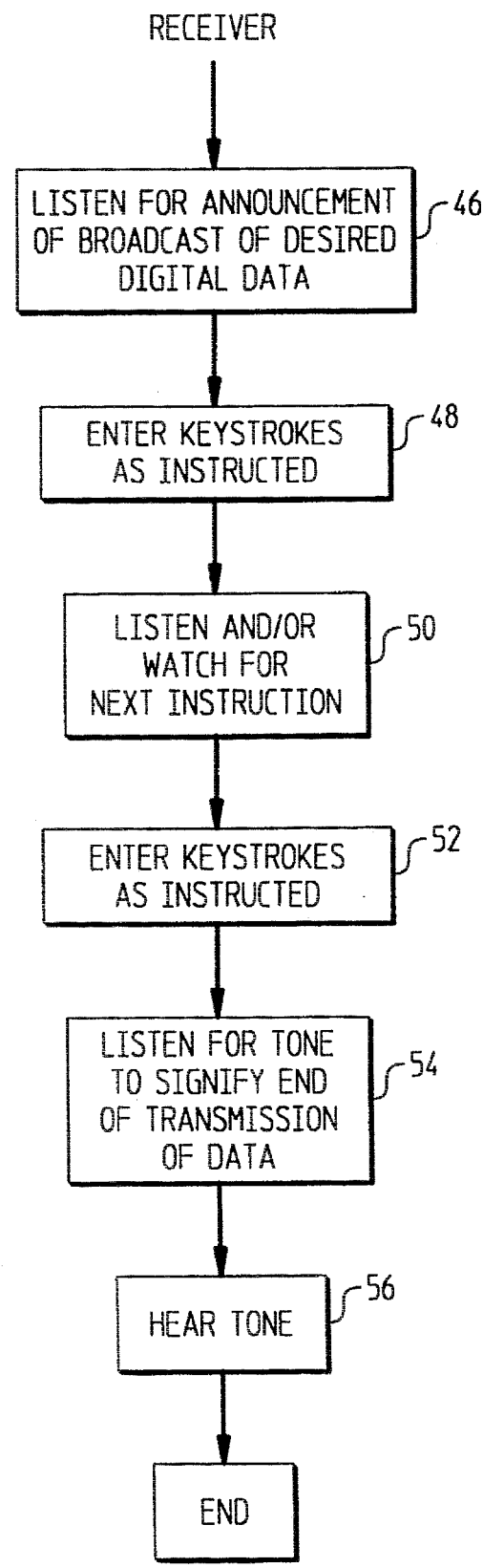
FIG. 3 is a flow chart diagram of the operation of the consumer receiver for receiving a broadcast commercial message in accordance with the present invention.

In operation, the consumer watches a commercial message on TV 10. Data which is transmitted imbedded in the horizontal or vertical synchronizing intervals of the video signal is detected and stripped from the video signal by video sync data separator 12. Data transfer controller 14 operates to couple the detected data through the modem 16 and switch 18, which simulates an incoming telephone call to modem 22 and ultimately for storage in memory 24. Although a special purpose add on computer board interface and software could be designed to accomplish the same data transfer to computer 20, the use of readily available standard modem hardware and software makes economical use of a large base of installed hardware and software, and avoids the need to open the case of computer 20. Instead, immediate access to the present system is provided to the consumer by connecting the additional data receiver 13 directly to the existing modem 22 input. FIGS. 2 and 3 depict the sequence of operation of the apparatus of FIG. 1.

The first step is to announce that free data to be made available is about to be broadcast. The sponsor's name and the type of data available is announced at this step. The instructions delivering codes needed at the consumer's computer are placed at any opportune time or more than one time in the commercial message. At the end of the commercial message a confirmation tone is broadcast to signify to the receiver that all steps have been taken, and that the data was actually sent and received. The consumer remains attentive until the confirmation tone has sounded. The commercial message is intertwined with the activity for delivering the digital data. The receiving party, paying close attention to the commercial broadcast message learns the steps necessary to receive the broadcast digital data.

At the broadcaster (FIG. 2), the regular broadcast is transmitted at step 30. At the beginning of a commercial message 32, announcement 34 of the availability of free data (which will be transmitted as a digital data packet) is made. The key code to set up to receive data is broadcast at step 36. Entry of the set up key code into keyboard 28 will place data receiver 13 in readiness to receive data. Thereafter, the broadcaster completes the commercial message at step 38, and broadcasts the key code at step 40 necessary to decode received digital data. When the broadcast of digital data at step 42 is done, an audible tone is sent at step 44 which lets the consumer know that data transmission is complete.

At the receiver (FIG. 3), a complimentary series of steps are carried out. In particular, the consumer listens to the announcement 46 that free desirable digital data will be broadcast. The attentive consumer then enters key strokes corresponding to the code as instructed at step 48. The consumer then watches and listens 50 for the next instruction and enters key strokes when instructed at step 52. At the end of a listening period 54, a tone is heard 56 signifying the completion of data transmission.

Figure 4:
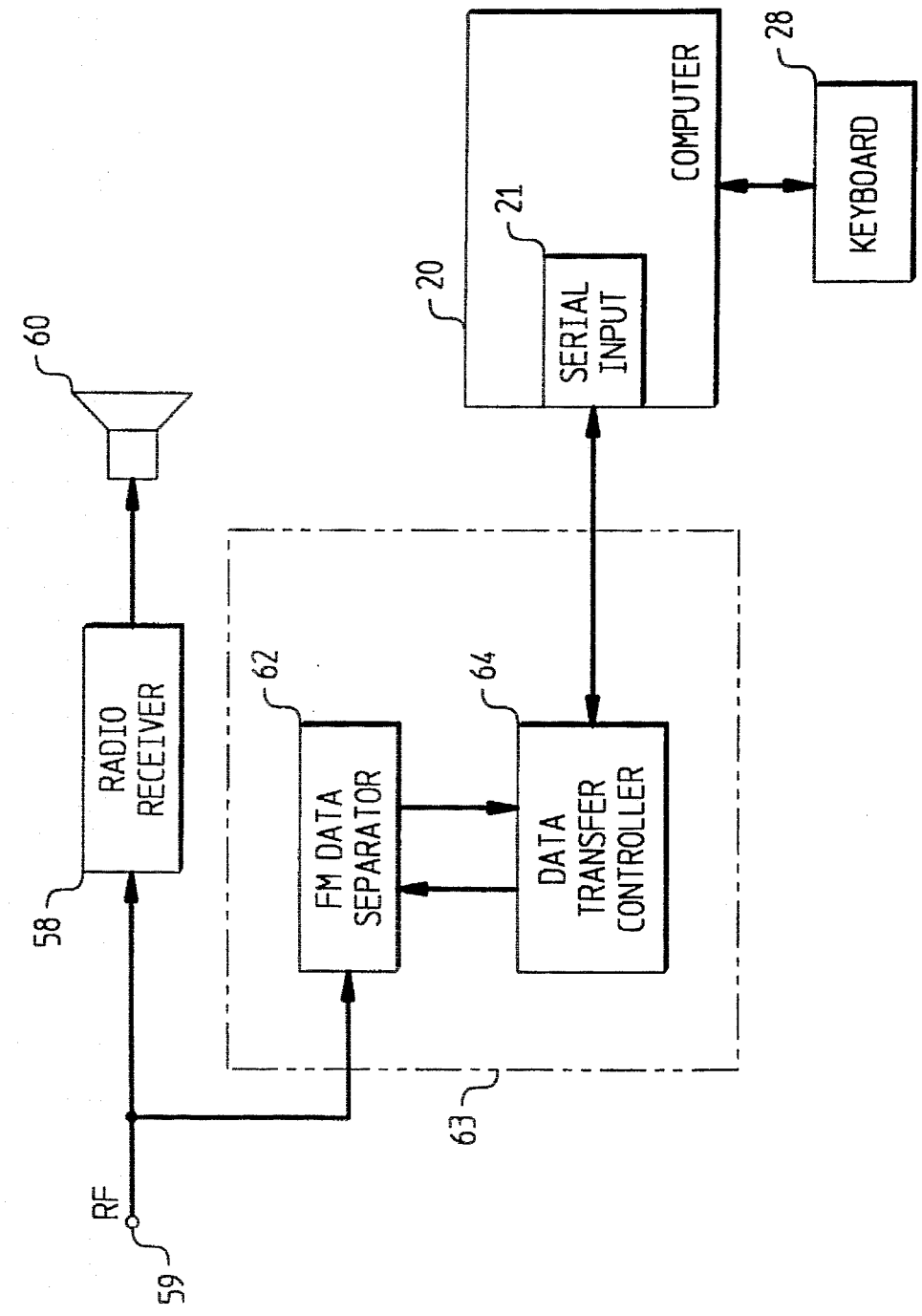
FIG. 4 is a block diagram of a system embodying the present invention wherein imbedded data is encoded onto an FM signal and delivered to consumers.

A radio implementation of the present invention is illustrated in FIG. 4. A radio 58 is connected to a source of FM signal transmitted on a broadband RF spectrum at antenna terminal 59. Broadband RF may be broadcast over a coaxial cable or fiber optic link. A home computer 20 including keyboard 28 and serial input port 21 is coupled to antenna terminal 59 through a data receiver 63 which includes a data transfer controller 64 and FM data separator 62. Data receiver 63 also includes a tuner for receiving the same FM audio signal as is received on radio receiver 58 and heard via speaker 60. Data receiver 63 is either a stand alone independent unit or a plug in add on computer circuit board configured to fit a standard expansion slot in computer 20 with internal access to the parallel data input computer bus. An alternate interface is via a PCMCIA expansion slot. An integrated computer add on circuit board may also contain the FM receiver 58.

In operation, the consumer listens to a commercial message on receiver 58. Data which is transmitted in the FM signal is detected and separated by data separator 12. Data transfer controller 64 operates to couple the detected data through the serial input 21 and ultimately for storage in computer 20. The consumer must enter in keyboard 28 codes received during a commercial message in order to receive and decode the desired free digital data.

Figure 5:
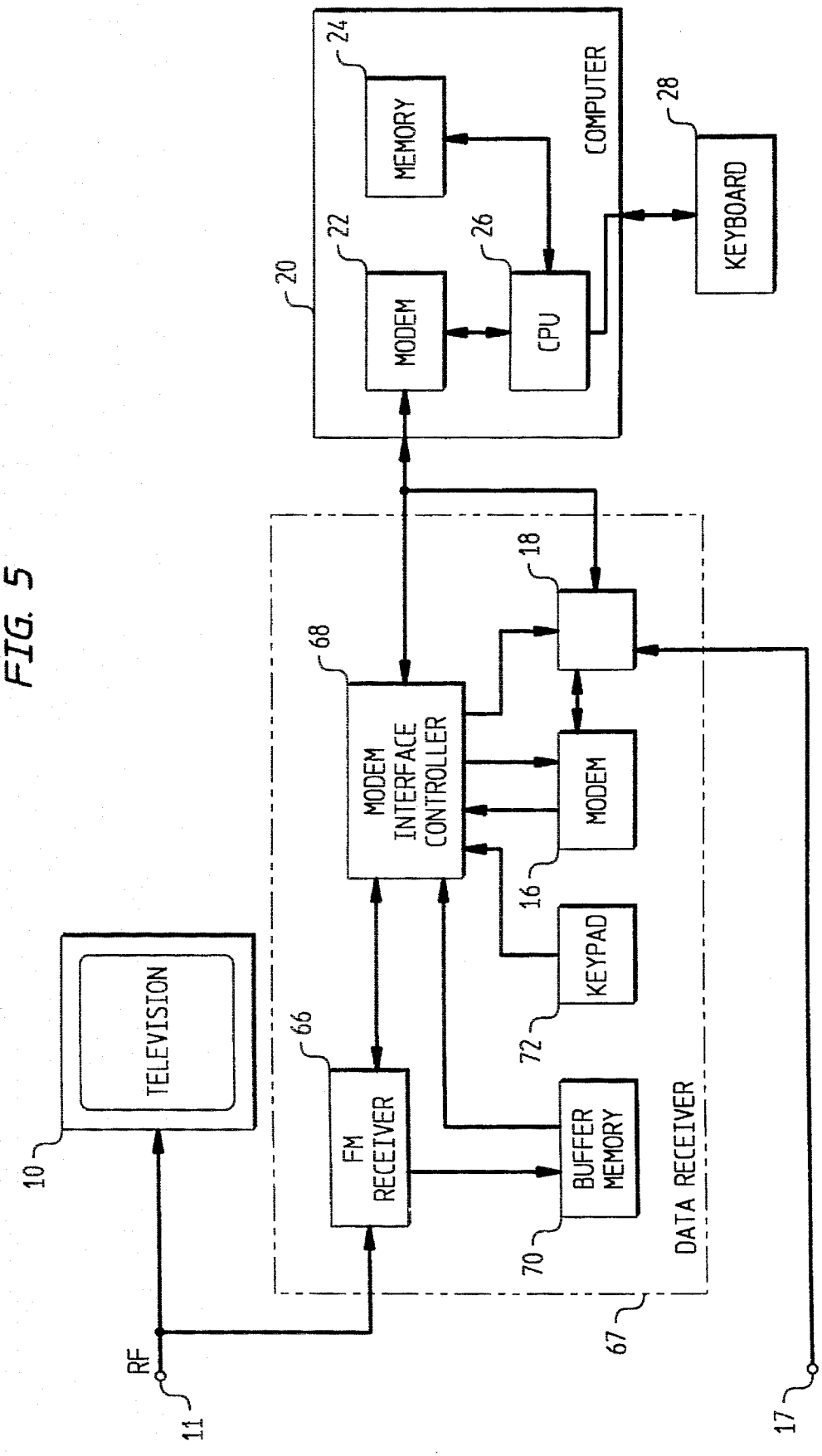
FIG. 5 is a block diagram of a system embodying the present invention wherein imbedded data is encoded onto an FM signal and stored locally for delivery to consumers.

An embodiment of the invention using an FM data receiver in conjunction with reception of video programming is shown in FIG. 5. Digital data is received outside of the channel used to transmit the video signal. The use of the FM band for data broadcast permits higher data rates as compared to the data rates available using digital signals imbedded in the synchronizing intervals of a video signal. Accordingly, much more data can be delivered at a higher data rate. In order to hold the larger data, a buffer memory 70 is provided in data receiver 67 for transferring data received from FM receiver 66 to modem interface controller 68. Buffer memory 70 also provides for matching data rates between the data rate of the modems 16 and 22 with the higher data rate of the FM signal. Data receiver 67 include an optional keypad 72 for controlling operations and entering instructions. Otherwise, keyboard 28 on computer 20 may be used for this purpose.

Figure 6:
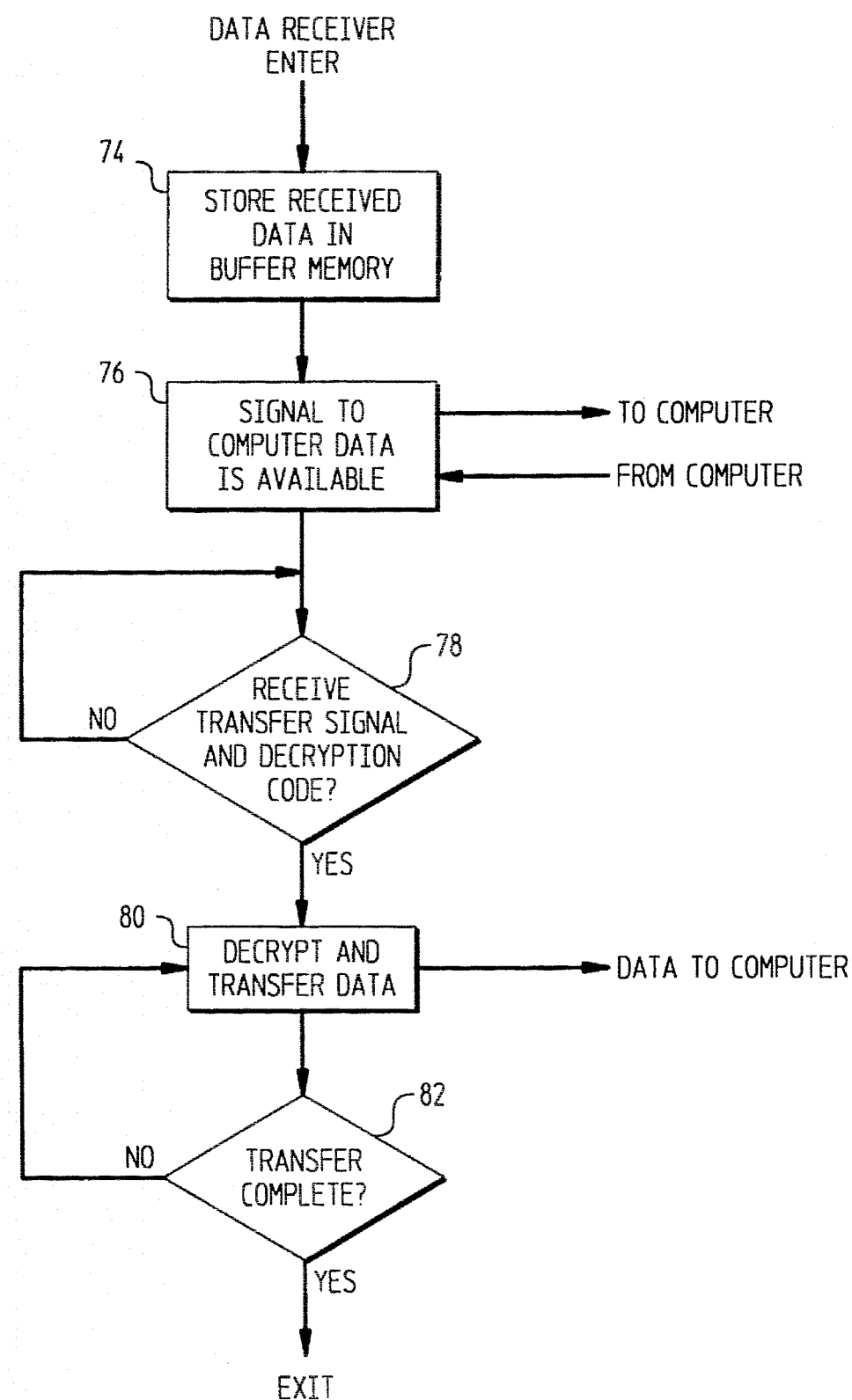
FIG. 6 is a flow chart diagram of the operation of a data receiver for receiving and locally storing a broadcast commercial message in accordance with the present invention.

In operation, data on the FM band is received at a first data rate and stored in buffer memory 70. Later, the contents of buffer memory 70 are decrypted and sent to computer 20 at a second data rate, lower than the first data rate. Thus, data receiver 67 permits the reception of data at high data rates from the FM band, to be matched with transfer of data at a lower data rate compatible with modems 16 and 22. FIGS. 6 and 7 depict the sequence of operation of the data receiver 67 and computer 20 of FIG. 5.

At the data receiver (FIG. 6), data is received on the FM band and stored in data memory at step 74. When data is available at step 76, a signal to the computer is generated. The computer responds with a transfer signal indication, and an encryption code which the consumer has previously received as part of the broadcast commercial message. After the transfer signal and encryption codes are received 78, the data is decrypted and transferred 80 to the computer, until all of the data transfer is complete at step 82.

At the computer (FIG. 7), a complimentary series of steps are carried out. In particular, the computer receives a signal at step 84 to indicate that data is available, and responds by sending control signals to set the data rate of the modems and the modem interface controller at step 86. Data transfer begins after the decryption code is sent from the computer to the data receiver at step 88. Data transfer continues at the rate of the computer modems 16 and 22 (FIG. 5) at step 90 the transfer is complete The instructions and the necessary key codes to enter into the consumer's computer could vary from a simple enable code to the computer to receive the clear text broadcast data, up to an elaborate decryption scheme. As used herein, encoding, scrambling and encrypting are functionally equivalent, and the terms decryption code, a decryption key, and an enable code are functional equivalents of a key code. The first consideration is to present a sequence of tasks that the average consumer can easily accomplish without undue burden. The second consideration is to make the steps difficult or practically impossible for an unattended computer to perform. For example, character recognition software can interpret screen text. Speech recognition software can interpret speech. Delivering the steps or codes orally instead of posting them on a TV screen adds complexity for an unattended computer because the voice recognition is a generally more difficult task than text recognition.

It is noted that only a one way broadcast communication channel carrying digital data packets along with the regular broadcast is required. The sponsor is rewarded because close attention is paid at the time that his commercial message is delivered. The consumer is rewarded by the content of the digital data. The goal is to insure viewership of the commercial message in order to obtain the free data.

What is claimed is:

1. In a broadcast signal transmission system, including a broadcast message, a method for distributing digital data to a plurality of receivers, said method comprising:

generating a key code;

encrypting said digital data using said key code to form an encrypted digital data packet;

combining said key code with said broadcast message to form a combined broadcast message, said key code being unencrypted;

transmitting said combined broadcast message to form a broadcast message; and transmitting said encrypted digital data packet; and at each of said plurality of receivers, receiving said broadcast message;

displaying said broadcast message;

receiving said key code from said displayed broadcast message;

receiving said encrypted digital data packet;

manually entering said key code at said receiver to form a manually entered key code; and decrypting said encrypted digital data packet using said manually entered key code.

2. A method in accordance with claim 1, where said combined broadcast message is embodied in a television signal.

3. A method in accordance with claim 1, where said combined broadcast message is embodied in a radio signal, said key code is combined with the audio program material of said broadcast message, and said key code is received aurally.

4. A method in accordance with claim 1, where said digital data is transmitted in the same frequency band as said broadcast message.

5. A method in accordance with claim 1, where said digital data is transmitted in a different frequency band as said broadcast message.

6. A method in accordance with claim 2, wherein said key code is combined with said broadcast message by combining said key code with the video program material of said broadcast message, and said key code is received visually.

7. A method in accordance with claim 2, wherein said key code is combined with the audio program material of said broadcast message, and said key code is received aurally.

8. In a broadcast signal transmission system, including a broadcast message, a receiver method for distributing digital data to a plurality of receivers, said system including generating a key code; encrypting said digital data using said key code to form an encrypted digital data packet; combining said key code with said broadcast message to form a combined broadcast message, said key code being unencrypted; transmitting said combined broadcast message to form a broadcast message; and transmitting said encrypted digital data packet to each of said plurality of receivers, said receiver method comprising:

receiving said broadcast message;

displaying said broadcast message;

receiving said key code from said displayed broadcast message;

receiving said encrypted digital data packet;

manually entering said key code at said receiver to form a manually entered key code; and decrypting said digital data packet using said manually entered key code.

9. A receiver method in accordance with claim 8, where said digital data is received in the same frequency band as said broadcast message.

10. A receiver method in accordance with claim 8, where said digital data is received in a different frequency band as said broadcast message.

11. A receiver method in accordance with claim 8, wherein said key code is combined with said broadcast message by combining said key code with the video program material of said broadcast message, and said key code is received visually.

12. A receiver method in accordance with claim 8, wherein said key code is combined with the audio program material of said broadcast message, and said key code is received aurally.

13. In a broadcast signal transmission system, including a broadcast message, an apparatus for distributing digital data to a plurality of receivers, said apparatus comprising:

means for generating a key code;

means for encrypting said digital data using said key code to form an encrypted digital data packet;

means for combining said key code with said broadcast message to form a combined broadcast message, said key code being unencrypted;

means for transmitting said combined broadcast message to form a broadcast message; and means for transmitting said encrypted digital data packet; and at each of said plurality of receivers, means for receiving said broadcast message;

means for displaying said broadcast message;

means for receiving said key code from said displayed broadcast message;

means for receiving said encrypted digital data packet;

means for manually entering said key code at said receiver to form a manually entered key code; and means for decrypting said encrypted digital data packet using said manually entered key code.

14. An apparatus in accordance with claim 13, where said combined broadcast message is embodied in a television signal.

15. An apparatus in accordance with claim 13, where said combined broadcast message is embodied in a radio signal, said key code is combined with the audio program material of said broadcast message, and said key code is received aurally.

16. An apparatus in accordance with claim 13, where said digital data is transmitted in the same frequency band as said broadcast message.

17. An apparatus in accordance with claim 13, where said digital data is transmitted in a different frequency band as said broadcast message.

18. An apparatus in accordance with claim 14, wherein said key code is combined with said broadcast message by combining said key code with the video program material of said broadcast message, and said key code is received visually.

19. An apparatus in accordance with claim 14, wherein said key code is combined with the audio program material of said broadcast message, and said key code is received aurally.

20. In a broadcast signal transmission system, including a broadcast message, a receiver apparatus for distributing digital data to a plurality of receivers, said system including generating a key code; encrypting said digital data using said key code to form an encrypted digital data packet; combining said key code with said broadcast message to form a combined broadcast message, said key code being unencrypted; transmitting said combined broadcast message to form a broadcast message; and transmitting said encrypted digital data packet; and at each of said plurality of receivers, said receiver apparatus comprising:

means for receiving said broadcast message;

means for displaying said broadcast message;

means for receiving said key code from said displayed broadcast message;

means for receiving said encrypted digital data packet;

means for manually entering said key code at said receiver to form a manually entered key code; and means for decrypting said digital data packet using said manually entered key code.

21. A receiver apparatus in accordance with claim 20, where said digital data is received in the same frequency band as said broadcast message.

22. A receiver apparatus in accordance with claim 20, where said digital data is received in a different frequency band as said broadcast message.

23. A receiver apparatus in accordance with claim 20, wherein said key code is combined with said broadcast message by combining said key code with the video program material of said broadcast message, and said key code is received visually.

24. A receiver apparatus in accordance with claim 20, wherein said key code is combined with the audio program material of said broadcast message, and said key code is received aurally.

\* \* \* \* \*